(12) United States Patent
Doppstadt

(10) Patent No.: US 10,737,199 B2
(45) Date of Patent: Aug. 11, 2020

(54) CLEARING DEVICE

(71) Applicant: Doppstadt Familienholding GmbH, Velbert (DE)

(72) Inventor: Ferdinand Doppstadt, Velbert (DE)

(73) Assignee: DOPPSTADT FAMILIENHOLDING GMBH, Velbert (DE)

( * ) Notice: Subject to any disclaimer, the term of this patent is extended or adjusted under 35 U.S.C. 154(b) by 3 days.

(21) Appl. No.: 16/317,594

(22) PCT Filed: Jul. 12, 2017

(86) PCT No.: PCT/EP2017/067640
§ 371 (c)(1),
(2) Date: Jan. 14, 2019

(87) PCT Pub. No.: WO2018/011318
PCT Pub. Date: Jan. 18, 2018

(65) Prior Publication Data
US 2019/0291026 A1    Sep. 26, 2019

(30) Foreign Application Priority Data
Jul. 15, 2016  (DE) .................. 20 2016 004 349 U

(51) Int. Cl.
*B01D 24/20* (2006.01)
*B01D 24/46* (2006.01)
*B01D 24/00* (2006.01)

(52) U.S. Cl.
CPC ........... *B01D 24/205* (2013.01); *B01D 23/16* (2013.01); *B01D 24/461* (2013.01); *B01D 24/4668* (2013.01)

(58) Field of Classification Search
CPC .... B01D 23/16; B01D 24/205; B01D 24/461; B01D 24/4668; B08B 9/08; B08B 9/0856
See application file for complete search history.

(56) References Cited

U.S. PATENT DOCUMENTS

| 584,112 A | 6/1897 | Greenerd |
| 1,150,876 A * | 8/1915 | Nichols .................. B01D 15/02 210/189 |

(Continued)

FOREIGN PATENT DOCUMENTS

| DE | 202008001685 U1 | 4/2008 |
| EP | 1920812 A1 | 5/2008 |

OTHER PUBLICATIONS

International Search Report for International Application No. PCT/EP2017/067640, dated Nov. 2, 2017.

(Continued)

*Primary Examiner* — Randall E Chin
(74) *Attorney, Agent, or Firm* — Jason H. Vick; Sheridan Ross, PC

(57) ABSTRACT

The invention relates to a clearing apparatus (I), especially for clearing and/or maintaining of filter basins (7), consisting of at least one carrier (1), at least one undercarriage (2), at least one removal device (3), at least one driving device (4) and at least one pushing or guiding device (10), wherein the removal device (3) is situated in the front and/or before the undercarriage (2) and/or in front of an axle (21) of the undercarriage (2) in the travel and/or removal direction (a), the pushing or guiding device (10) is provided at the rear in the travel and/or removal direction (a), and wherein the removal device (3) comprises a platform (32) on which a drivable or driven removal means is circulating, such as a drivable or driven flexible circulating chain (31) and/or a flexible circulating belt (31), in order to remove material from a bottom (71) of the filter basin (7), transport it away and/or dispose of it.

9 Claims, 3 Drawing Sheets

(56) References Cited

U.S. PATENT DOCUMENTS 3,720,299 A * 3/1973 Wegmann ............ B01D 24/205
198/307.1
6,228,256 B1 * 5/2001 Ekenback ............ B01D 24/205
210/143

OTHER PUBLICATIONS

Written Opinion for International Application No. PCT/EP2017/067640, dated Nov. 2, 2017.
International Preliminary Report on Patentability for International Application No. PCT/EP2017/067640, dated Jan. 24, 2019.

* cited by examiner

CLEARING DEVICE

CROSS-REFERENCE TO RELATED APPLICATIONS

This application is a National Stage Application Under 35 U.S.C. 371 of PCT Application No. PCT/EP2017/067640, having an international filing date of 12 Jul. 2017, which designated the United States, which PCT application claimed the benefit of German Application No. 20 2016 004 349.9, having a filing date of 15 Jul. 2016, each of which are incorporated herein by reference in their entirety.

SUMMARY

The invention relates to a clearing apparatus (I), especially for clearing and/or maintaining of filter basins.

Filter basins, such as sand filter clarifying basins, require a regular servicing by removal of the sediment layer that arises during operation. This sediment layer has a thickness of around 1 cm to 5 cm and needs to be removed as precisely as possible, without significant losses of the filter sand. The filter basins possess a base area up to several 1000 $m^2$ and are regularly cleaned by machine. The apparatuses used for this have working widths of 2 to 3 m, are usually outfitted with crawler tracks and have an operational weight of 5 to 8 tons. Owing to the resulting dimensions of the apparatuses, however, they have but limited maneuverability. Especially in areas requiring a precise or very accurate steering of the apparatuses, such apparatuses cannot be used, because there is a danger of damaging or destroying certain structural features of the filter basins. Such structural features are, for example, columns, walls, pump shafts, meters or other structural elements.

When performing this cleaning work, the sediment layers need to be removed as completely as possible. Losses of filter sand should be avoided as much as possible. In order to avoid damage and/or impairment due to the use of apparatuses, a work zone with a width of around half a meter distant from these features is cleared manually in the prior art, i.e., using shovels or the like. This activity is naturally very strenuous and therefore qualifies as heavy physical labor. It should therefore be classified accordingly and is accordingly very time consuming. This may result in long down times for the use of the filter basins. A qualified mechanical, technological support for this manual work is not known at present.

The problem which the invention proposes to solve is therefore to provide a device which eliminates at least one of the drawbacks described above. Accordingly, another problem of the invention is to relieve the workers of heavy physical labor and to improve the occupational health and safety of the workers performing this activity. Furthermore, an effective outcome should be achieved in terms of quality of the clearing and the processing time, in particular wherein the down time for the filter basins should be reduced, resulting in cost savings.

The problem of the invention is solved by a clearing apparatus, especially for clearing and/or maintaining of filter basins, consisting of at least one carrier, at least one undercarriage, at least one removal device, at least one driving device and at least one pushing and/or guiding device, wherein the removal device is situated in the front and/or before the undercarriage and/or in front of an axle of the undercarriage in the travel and/or removal direction, the pushing and/or guiding device is provided at the rear in the travel and/or removal direction, and wherein the removal device comprises a platform, on which a drivable and/or driven flexible removal means is circulating to remove material from a bottom of the filter basin, transport it away and/or dispose of it. With such a device, it is now possible to mechanically remove the sediment layer as a removed material layer even in the critical areas of the filter basins, i.e., at a distance of around 50 cm from these devices. This eliminates all the drawbacks of the prior art that were mentioned above. A substantial increase in labor productivity is achieved while at the same time reducing the danger of accidents and especially reducing the very heavy physical labor. The down time, formerly causing considerable costs, can be reduced to a large degree. At this same time, this also linked to an improvement in the quality of the removal and/or cleaning work. Due to the small structural dimensions of the apparatus, it is possible to perform the removal and/or cleaning work by machine in all the areas mentioned above. Accordingly, the solution according to the invention consists of a handheld device equipped with a motor that is very compact in construction. It is designed so that it can also be used in critical areas of the cleaning basin and/or sedimentation basin. The device can be guided by one worker, for example on 2 rails, and thus be used very precisely in the vicinity of boundaries, i.e., walls and technical installations. The energy for both the clearing process (sideways shifting of the sediment) and the advancing movement of the apparatus is provided by motor power. The substantially easier work resulting from this for the persons performing the activity is obvious. Another benefit of the invention is that the use of this apparatus is of course not just limited to filter basins and the clearing away of sediment deposits. Instead, the device may also be used in areas where certain soil layers of a defined thickness and/or depth need to be removed. However, the invention shall be described only on the example of a clearing apparatus for the cleaning of filter basins.

A clearing apparatus, as described above, is characterized according to one modification of the invention in that the clearing apparatus is designed as a handheld, motorized clearing apparatus and has a working width of 40 cm to 120 cm, preferably 60 cm to 80 cm. The benefits that were described above are of course achieved in the same manner with this embodiment. The apparatus is accordingly easy to handle, can be guided and operated by a single worker, and requires no heavy physical labor. The apparatus is accordingly advantageously outfitted with at least one travel and/or at least one support axle. The undercarriage may for example be outfitted with low-pressure tires with a herringbone pattern, such as are used in horticulture or agriculture. However, it is also possible to provide the apparatus with a tracked undercarriage, such as a delta tracked undercarriage, in order to decrease the pressure on the ground and increase the traction.

One modification of the clearing apparatus according to the invention is characterized in that the platform of the removal device is formed by a frame on which at least three guide rollers guide a circulating chain and/or a circulating belt and removal elements and/or scrapers are provided on the circulating chain and/or the circulating belt, which remove the material and transport it away. The platform here may be designed as an open frame. However, it is equally possible to provide a plate as the bottom of the platform, which then terminates at a certain distance from the front boundary of the apparatus, so that the material can be discharged there at a desired distance from the respective boundary.

According to one advantageous modification, the invention is also characterized in that the frame is designed to be decoupled from the basic apparatus, so that the basic apparatus can also be used for other chores if needed. Naturally, this greatly improves the universality of the apparatus.

One special aspect of the clearing apparatus according to the invention is that one of the guide rollers is constructed in a swiveling manner, preferably in a range of up to 35 degrees, in order to change the discharge width for the removed material and in particular to ensure that the mound created by the removed material is pushed further along the unworked area and/or to prevent the material from falling back onto the worked area. Of course, this considerably improves the quality of the removal work, because now it is also possible to clean the marginal areas by machine in a very clean manner and with a defined depth setting. There is less loss of filter sand. Of course, the benefits mentioned above also occur in the modification of the invention now being described. Advantageously, the guide roller located closest to the housing or furthest from the front edge of the apparatus can swivel.

One variant of the cleaning apparatus according to the invention is characterized in that the removal device can both swivel about a horizontal axis transversely to the working direction and is also arranged such that it can be swiveled parallel and adjusted with respect to height on the carrier and/or housing in order to adapt and/or adjust the working range of the removal device relative to the bottom. Accordingly, this small handheld apparatus is also outfitted in very universal manner. Thus, the working height of the removal device can be adjusted. Moreover, this makes it possible to change the work angle with respect to the horizontal axis and longitudinal axis of the apparatus. In this way, a substantially better result in terms of removal performance and removal quality is of course achieved. Depending on the nature of the sediment layer being removed, the apparatus can therefore be optimally adjusted for the particular conditions. Thus, the operator can respond both to different thicknesses of the layer and different degree of moisture and/or different consistency of the sediment layers, such as very sticky layers, and adjust the apparatus optimally for the removal of this layer.

According to the invention, it has been discovered that one advantageous modification of the clearing apparatus is characterized in that a side guide is provided on the removal device at least on the right side in the removal direction, the side guide being designed preferably as a guide roller. In this way, the apparatus can be steered very precisely to the side, even over long processing distances, for example by being placed against a wall or a corresponding boundary and steered there. The person operating the apparatus can accomplish this by only slight sideways pressure, with no major effort. This side guide, which can be designed as a support roller, thus also makes the work of the apparatus operator easier in that the natural sideways drift of the scraper system and/or removal system is compensated. The side guide can be changed by a presetting for height and inclination to adapt to different local conditions. Of course, it is especially advantageous in another variant of the invention for this to be done even during the clearing process, for example, automatically, without having to halt the apparatus. In order to be able to travel along the inner radius of circular basins, it is also possible by one modification of the invention to equip the outside guidance in a swivel range with additional locking functions, so that it is possible to respond to the different radius of the basins by selecting an appropriate locking setting.

Moreover, it is advantageous for at least one height-adjusting and/or working depth-adjusting device to be provided on the removal device preferably in the form of a skid, at the front in the working direction, in order to adjust the depth of removal. The skid slides over the sediment layer which is present. The layer thickness (working height) for the layer being removed is derived in this case from the slide level of the skid. The setting range is advantageously 0-50 mm. However, this setting should not be taken as a limitation, since other layer thicknesses may also be adjusted depending the task to be solved. The skids may also be replaced by sensing wheels, optionally with low-pressure tires. The apparatus settings can be done both mechanically by bolts or also in a technically expanded version by an optionally hydraulic or electric adjustment initiated by the apparatus operator. Of course, it is also possible to outfit the apparatus with a self-regulating function for this adjustment option.

A clearing apparatus according to the invention is characterized in that wear elements are arranged on the scrapers, whose side facing toward the bottom has a bevel of preferably 10 to 15 degrees. These wear elements are advantageously made of a flexible material. Thanks to these wear elements, the service life of the overall apparatus is positively influenced to a significant extent. Instead of replacing the entire scraper, it is now possible when wear is present to only replace the wear elements. The scrapers according to the invention furthermore have a protrusion of 2 to 6 cm at their outward front side so as not to cause any damage when touching the walls or when touching other system elements of the filter basin. These wear elements may either be vulcanized on or they can also be fastened by means of screw connections to a scraper of 2-piece design.

The clearing apparatus according to the invention has an internal combustion engine or an electric motor as the driving device. The invention is in no way limited to this. Thus, it may be entirely appropriate to provide an electric motor as the driving device which is supplied with electrical energy by means of a tow cable. It is equally possible to provide the clearing apparatus with a battery-operated electric drive. Of course, it is also possible to provide a gasoline motor or a diesel motor as the driving device.

BRIEF DESCRIPTION OF THE DRAWINGS

The invention shall be described below with the aid of an exemplary embodiment.

DETAILED DESCRIPTION

Figure 1:
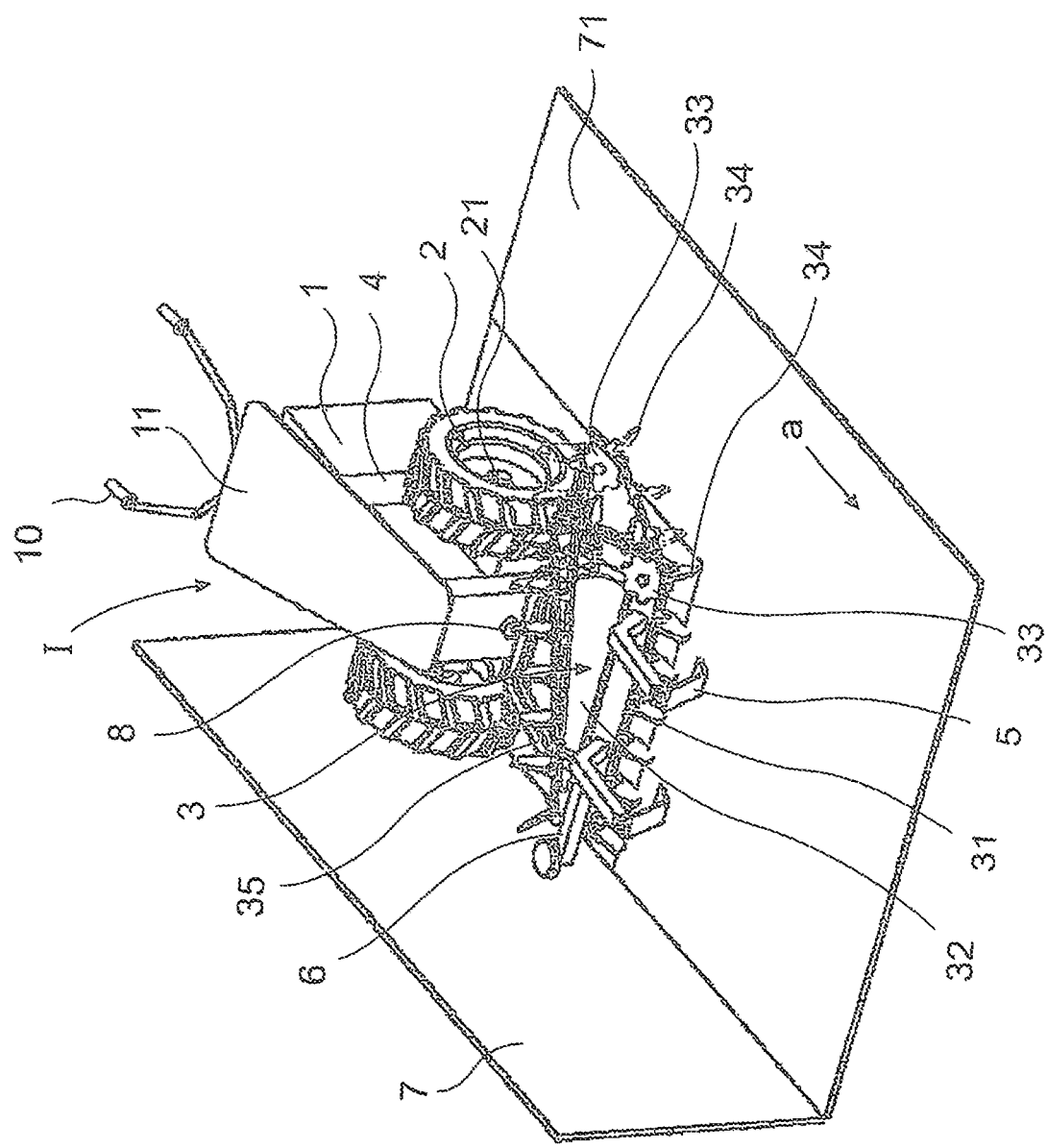
FIG. 1 shows a clearing apparatus according to the invention in a three-dimensional representation.
Figure 2:
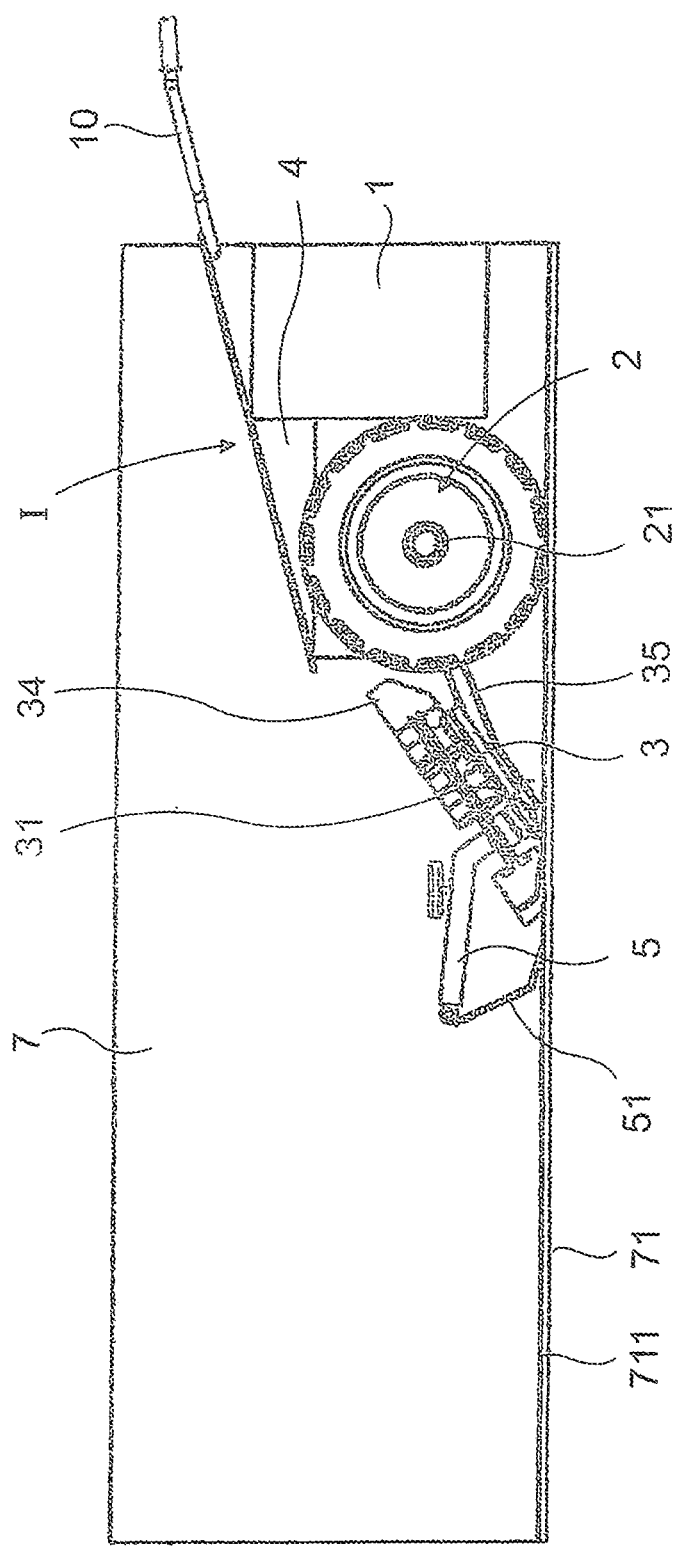
FIG. 2 shows the clearing apparatus of FIG. 1 in a side view.
Figure 3:
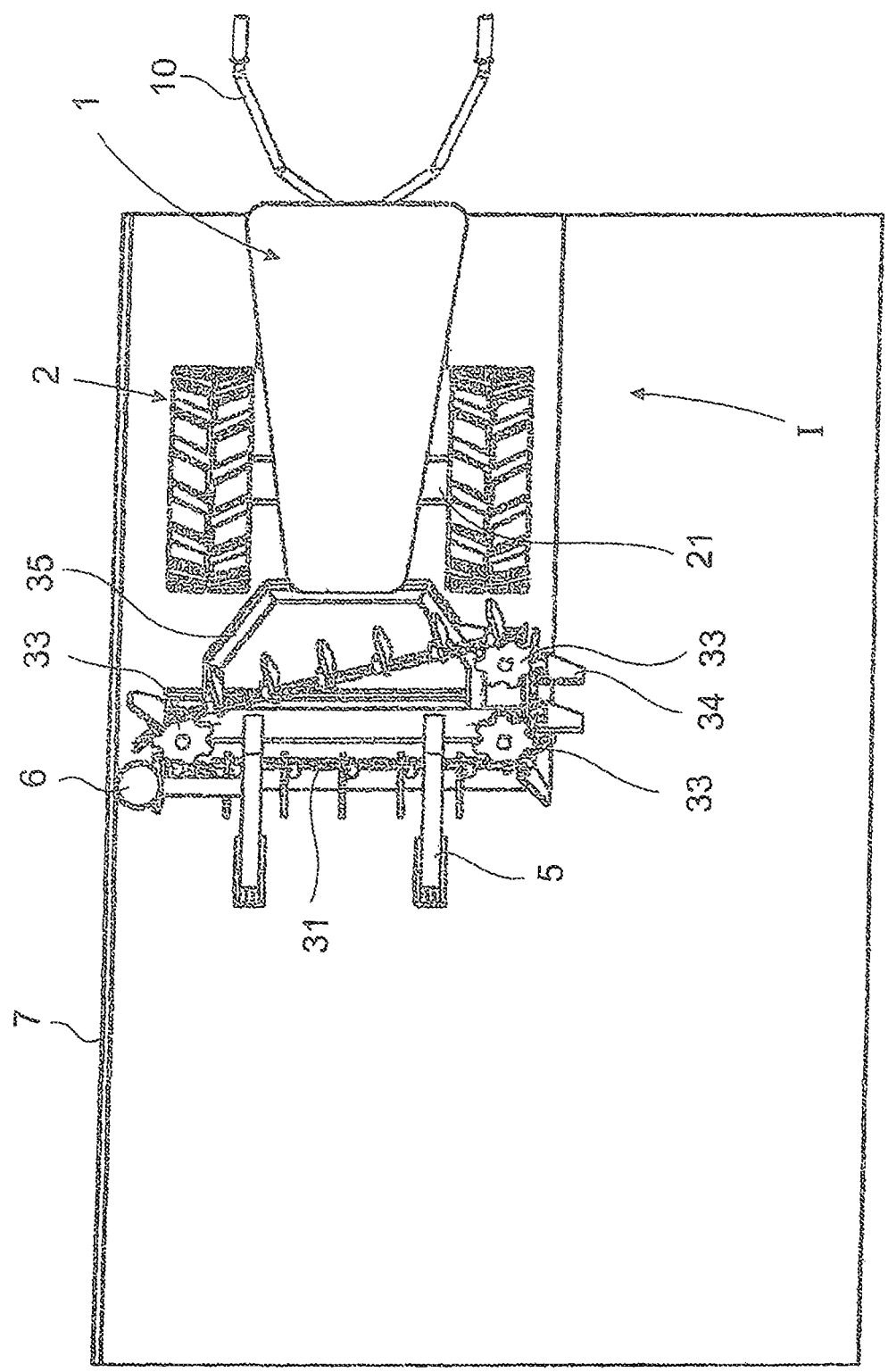
FIG. 3 shows the clearing apparatus of FIGS. 1 and 2 in a top view.

All 3 figures shall be described together in the following. That is, all reference numbers in all the figures are used in the same way for the same features. An arrow schematically indicates the clearing apparatus according to the invention with the reference number I. The apparatus is outfitted centrally with a carrier 1 and/or housing on which all system components of the clearing apparatus I are arranged. Beneath the carrier 1 is the undercarriage 2 with the axle 21 of the undercarriage. In the exemplary embodiment, the vehicle is designed with low-pressure tires in a herringbone pattern. As already mentioned, however, instead of these it is also possible to provide a tracked undercarriage. In the travel and/or removal direction a, at the front of the apparatus, there is situated the removal device 3. The removal device 3 is formed by a platform 32. On this platform 32 there are arranged 3 guide rollers 33, across which a flexible removal means, such as a circulating belt 31 and/or a circulating chain 31, runs in movable manner. The drive is performed mechanically by the driving device 4 via drive elements and/or force transmission elements (not described in detail). These may usually be designed as corresponding pinions, shafts, or a gearing. The invention is not limited to one of these variants. On the circulating chain 31 there are arranged circulating scrapers 34 as the removal elements. These serve for the removal of the sediment layer. In the representation of the figures, the circulating chain 31 runs to the left. The removed material is consequently moved at the right side in the direction of the undercarriage and after circulation carried across the guide roller 33 located near the undercarriage 2 and then discharged. In this way, a mound of the discharged material is formed at sufficient distance from the filter basin 7 and/or from the boundary wall of this filter basin 7. The scrapers 34, as mentioned above, may have a one-piece or two-piece design. Since this is not absolutely essential to an understanding of the invention, no detailed representation has been provided. In the travel and/or removal direction a, in front of the removal device 3, there are arranged two skids 5 in the representation of the figures. These each possess an angled feeler 51. These feelers 51 slide over the bottom 71 of the filter basin 7. From the respective height level of the feeler 51, the removal depth is then determined for the sediment layer being removed. As already mentioned above, this setting can be adapted as needed to the removal conditions. The removal device axle 8 is located on the carrier 1 and/or the housing. This removal device axle 8 is height-adjustable. However, with this removal device axle 8 it is also possible to perform a sideways angle adjustment for the removal device 3. This was already explained in detail above. At the rear end of the carrier 1 there is situated a pushing and/or guiding device 10, by means of which the apparatus can be moved correspondingly precisely and carefully in the filter basin 7. The covering of the carrier 1 and/or housing is denoted by the reference number 11.

The invention has been described above with the aid of an exemplary embodiment. However, the invention is not limited to this. The claims submitted now and afterwards with the application are an attempt to describe a broader protection without prejudice to the invention.

The references stated in the dependent claims point to the further embodiment of the subject matter of the main claim by the features of the respective dependent claim. However, these should not be construed as an abandoning of the achieving of an independent, substantive protection for the features of the back-referring dependent claims.

Features disclosed thus far only in the specification may be claimed in the further course of the proceeding as being of significance to the invention, for example to distinguish it from the prior art.

The invention claimed is:

1. A clearing device, configured for clearing and/or maintaining of filter basins, comprising at least one carrier, at least one undercarriage, at least one removal device, at least one driving device and at least one pushing and/or guiding device, wherein the removal device is situated in the front and/or before the undercarriage and/or in front of an axle of the undercarriage in the travel and/or removal direction, the pushing and/or guiding device is provided at the rear in the travel and/or removal direction and wherein the removal device comprises a platform on which a drivable and/or driven removal means is circulating, wherein the drivable and/or driven removal means is a drivable and/or driven flexible circulating chain and/or a flexible circulating belt configured to remove material from a bottom of the filter basin, transport the material away and/or dispose of the material, and wherein the platform of the removal device is formed by a frame on which at least three guide rollers guide the flexible circulating chain and/or the flexible circulating belt and removal elements and/or scrapers are provided on the flexible circulating chain and/or the flexible circulating belt, which are configured to remove the material and transport the material away, and wherein one of the guide rollers is constructed in a swiveling manner, in a range of up to 35 degrees, in order to change a discharge width for the removed material and to ensure that a mound created by the removed material is pushed further onto an unworked area and/or to prevent the material from falling back onto a worked area.

2. The clearing device as claimed in claim 1, wherein the clearing device is a handheld, motorized clearing apparatus and has a working width of 40 cm to 120 cm.

3. The clearing device as claimed in claim 1, wherein the removal device can both be swiveled about a horizontal axis transversely to the travel and/or removal direction and be swiveled parallel and adjusted with respect to height on the carrier in order to adapt and/or adjust the working range of the removal device relative to the bottom.

4. The clearing device as claimed in claim 1, wherein a side guide is provided on the removal device at least on the right side in the removal direction, wherein the side guide is a guide roller.

5. The clearing device as claimed in claim 1, wherein at least one height-adjusting and/or working depth-adjusting device is provided on the removal device in the form of a skid, at the front in the working direction, in order to adjust a depth of removal.

6. The clearing device as claimed in claim 1, wherein wear elements are arranged on scrapers, whose side facing toward the bottom has a bevel of 10 to 15 degrees.

7. The clearing device as claimed in claim 6, wherein the wear elements are arranged interchangeably on the scrapers.

8. The clearing device as claimed in claim 1, wherein an internal combustion engine or an electric motor is provided as the driving device.

9. The clearing device as claimed in claim 1, wherein the clearing device is a handheld, motorized clearing apparatus and has a working width of 60 cm to 80 cm.

* * * * *